United States Patent
Gordon et al.

(10) Patent No.: US 10,822,544 B2
(45) Date of Patent: Nov. 3, 2020

(54) NANOPARTICLES OF FLAME RETARDANT MAGNESIUM HYDROXIDE AND METHOD OF PRODUCTION THE SAME

(71) Applicant: JOINT STOCK COMPANY KAUISTIK, Volgograd (RU)

(72) Inventors: Elena Petrovna Gordon, Volgograd (RU); Alla Vitalievna Korotchenko, Volgograd (RU); Nadezhda Illarionovna Levchenko, Volgograd (RU); Tatiana Sergeevna Ugnovenok, Volgograd (RU)

(73) Assignee: JOINT STOCK COMPANY KAUSTIK, Volgograd (RU)

( * ) Notice: Subject to any disclaimer, the term of this patent is extended or adjusted under 35 U.S.C. 154(b) by 0 days.

(21) Appl. No.: 14/762,999

(22) PCT Filed: Oct. 6, 2014

(86) PCT No.: PCT/RU2014/000746
§ 371 (c)(1),
(2) Date: May 12, 2016

(87) PCT Pub. No.: WO2015/065241
PCT Pub. Date: May 7, 2015

(65) Prior Publication Data
US 2016/0264868 A1    Sep. 15, 2016

(30) Foreign Application Priority Data
Oct. 29, 2013 (RU) ................................ 2013148190

(51) Int. Cl.
*C09K 21/02* (2006.01)
*C08K 3/22* (2006.01)
(Continued)

(52) U.S. Cl.
CPC ................ *C09K 21/02* (2013.01); *C01F 5/14* (2013.01); *C01F 5/22* (2013.01); *C08K 3/22* (2013.01);
(Continued)

(58) Field of Classification Search
CPC ....................................................... C01F 5/14
See application file for complete search history.

(56) References Cited

U.S. PATENT DOCUMENTS 4,695,445 A * 9/1987 Nakaya .................... C01F 5/20
                                                          423/635
5,476,642 A * 12/1995 Skubla .................. B82Y 30/00
                                                          106/18.26
(Continued)

FOREIGN PATENT DOCUMENTS

CZ        9300994 A3    12/1994
DE       10304314 A1     8/2004
(Continued)

OTHER PUBLICATIONS

Ul-Hamid (A Beginners' Guide to Scanning Electron Microscopy, Springer Nature, Chapter 1, 2018) (Year: 2018).*
(Continued)

*Primary Examiner* — Liam J Heincer
(74) *Attorney, Agent, or Firm* — Brinks Gilson & Lione; John C. Freeman (57) ABSTRACT

The invention relates to chemical technologies, specifically nanoparticles of flame retardant magnesium hydroxide, and a process for the preparation thereof. The present nanoparticles of flame retardant magnesium hydroxide, including surface-processed nanoparticles, have a hexagonal plate-like structure with a specific surface area of up to 20 m²/g, an average diameter of the secondary particles of up to 2 µm, a diameter of 10% of the secondary particles of up to 0.8 µm, (Continued)

a diameter of 90% of the secondary particles of up to 5 μm, with a longitudinal size of the primary particles of from 150 to 900 nm, and a thickness of from 15 to 150 nm.

14 Claims, 8 Drawing Sheets

(51) Int. Cl.
  *C01F 5/22* (2006.01)
  *C01F 5/14* (2006.01)
  *C08K 7/00* (2006.01)

(52) U.S. Cl.
  CPC ............ *C08K 7/00* (2013.01); *C01P 2004/03* (2013.01); *C01P 2004/24* (2013.01); *C01P 2004/51* (2013.01); *C01P 2004/54* (2013.01); *C01P 2004/60* (2013.01); *C01P 2004/61* (2013.01); *C01P 2006/12* (2013.01); *C01P 2006/14* (2013.01); *C01P 2006/19* (2013.01); *C08K 2003/2217* (2013.01); *C08K 2003/2224* (2013.01); *C08K 2201/003* (2013.01); *C08K 2201/004* (2013.01); *C08K 2201/006* (2013.01); *C08K 2201/011* (2013.01)

(56) References Cited

U.S. PATENT DOCUMENTS

| | | | |
|---|---|---|---|
| 5,872,169 A | 2/1999 | Elsner et al. | |
| 5,906,804 A * | 5/1999 | Aral | C01F 5/14 423/265 |
| 7,514,489 B2 * | 4/2009 | Granada, Jr. | C01F 5/14 423/635 |
| 2002/0001715 A1 * | 1/2002 | Redondo | C08L 23/04 428/375 |
| 2003/0235693 A1 * | 12/2003 | Oishi | C01F 5/14 428/422.8 |
| 2007/0176155 A1 * | 8/2007 | Granada, Jr. | C01F 5/14 252/601 |
| 2008/0181844 A1 * | 7/2008 | Feldmann | B82Y 30/00 423/639 |
| 2009/0098363 A1 * | 4/2009 | Herbiet | C01F 5/14 428/327 |
| 2009/0226710 A1 * | 9/2009 | Herbiet | C01F 5/14 428/330 |
| 2011/0143139 A1 * | 6/2011 | Maddan | A62D 3/36 428/402 |
| 2013/0210988 A1 * | 8/2013 | Miyata | C08K 3/22 524/436 |
| 2014/0042011 A1 * | 2/2014 | Hattori | C01G 9/02 204/157.43 |
| 2014/0186622 A1 * | 7/2014 | Kudo | C01F 5/14 428/372 |
| 2015/0005429 A1 * | 1/2015 | Nakamura | C01F 5/14 524/436 |
| 2015/0177430 A1 * | 6/2015 | Nakamura | A01G 9/1438 252/587 |
| 2016/0264868 A1 * | 9/2016 | Gordon | C01F 5/22 |

FOREIGN PATENT DOCUMENTS

| | | |
|---|---|---|
| EP | 0365347 A1 | 4/1990 |
| EP | 0780425 A1 | 6/1997 |
| EP | 0949305 A2 | 10/1999 |
| EP | 2628710 A1 | 8/2013 |
| JP | H3-170325 | 7/1991 |
| JP | H6-504027 | 6/1994 |
| JP | H10-503458 | 3/1998 |
| JP | 2001508015 A | 6/2001 |
| JP | 2006160603 A | 6/2006 |
| JP | 2013203560 | 7/2013 |
| JP | 2013151424 A | 8/2013 |
| RU | 2334678 C2 | 3/2008 |
| RU | 2373140 C1 | 11/2009 |
| RU | 2422364 C2 | 2/2011 |
| WO | WO 2006030446 A1 | 3/2006 |
| WO | WO 2007117841 | 10/2007 |
| WO | WO 2012050222 A1 | 4/2012 |

OTHER PUBLICATIONS

Yoshida et al. (Journal of the Ceramic Society of Japan, 117(11), 1166-1171, 2009) (Year: 2009).*

* cited by examiner

NANOPARTICLES OF FLAME RETARDANT MAGNESIUM HYDROXIDE AND METHOD OF PRODUCTION THE SAME

The present invention relates to chemical technologies, specifically to nanoparticles of flame retardant magnesium hydroxide, and a process for the preparation thereof.

Magnesium hydroxide, as well as aluminium hydroxide, draws a great interest as it can be used as flame retardant. Decomposition of magnesium hydroxide into magnesium oxide and water begins at 300-320° C. which is 100° C. higher than the decomposition temperature for aluminium hydroxide. Due to the fact that aluminium hydroxide is an amphoteric substance, it does not interact with hydrogen chloride released during the combustion of PVC. Magnesium hydroxide is a weak base and it interacts with hydrogen chloride released during thermal decomposition of PVC. It has been experimentally proven that fuming of PVC compositions containing magnesium hydroxide is substantially lower than that of the aluminium hydroxide compositions. This is due to the fact that magnesium chloride as a product of the interaction of magnesium hydroxide with hydrogen chloride, catalyzes the process of crosslinking polyene chains formed after the cleavage of hydrogen chloride, which suppresses the formation of volatile aromatic hydrocarbons such as benzene and toluene that contribute to filming. Therefore, based on the cumulative effect of aluminium hydroxide and magnesium hydroxide on the characteristics used to evaluate the quality of cable compositions with lowered flammability, namely the oxygen index value, the amount of the released hydrogen chloride and the optical density of fumes, it is safe to conclude that magnesium hydroxide has a considerable advantage over aluminium hydroxide. [Смелков С.И., Рябиков А.И., Ильин В.И. Снижение пожарной опасности кабельных изделий с изоляцией и оболочками из ПВХ материалов // Пожарная безопасность. 2011, No. 2, с. 66-72.] ([Smelkov S. I., Ryabikov A. I., Ilyin V. I. Snizheniye pozharnoy opasnosti kabelnykh izdeliy s izolyatsiyey i obolochkami iz PVKh materialov//Pozharnaya bezopasnost. 2011, No. 2, s. 66-72.]). On that fact is based the use of magnesium hydroxide as a smoke-suppressing, non-toxic flame retardant in plastics, rubbers and other materials.

However, the addition of magnesium hydroxide to a polymeric matrix in the amount sufficient for fire retardation which makes up to about 60 wt. % or more, leads to a reduction in mechanical properties of polymers and in technological effectiveness of their production [Huaqiang Cao, He Zheng, Jiefu Yin et al. Mg(OH)$_2$ complex nanostructures with superhydrophobicity and flame retardant effects//Journal Phys. Chem. C 2010, 114, p. 17362-17368]. In order to use magnesium hydroxide as an flame retardant filler in polymeric matrices without a reduction in the mechanical properties of the polymers and in the technological effectiveness of production, the specific surface area of magnesium hydroxide, as determined by the BET method, must not exceed 20 m$^2$/g, more preferably 15 m$^2$/g, the average diameter of secondary particles, as determined by the laser diffraction method, must not exceed 5 μm, more preferably 2 μm. The reduction in the size of primary particles allows achieving a more uniform distribution of the filler particles in a polymeric matrix. Furthermore, magnesium hydroxide, due to the plate-like shape of its particles and high characteristic ratio of their geometric characteristics, is potentially a reinforcing filler for polymers. It should be noted that in order to use magnesium hydroxide as a flame retardant filler in polymers, the weight content of admixtures such as chlorides, calcium, iron, etc. must be strictly limited.

The surface processing of magnesium hydroxide particles allows to achieve a better compatibility of the inorganic particles with a polymeric matrix, improves the uniformity of the physical properties of composites, and increases the resistance of the end products to moisture and temperature exposure.

It is known that magnesium hydroxide crystals, in particular fine hexagonal plate-like crystals usually tend to aggregate to form small-sized agglomerates (secondary particles), which is the reason for their low compatibility with an organic matrix and the reduction of their mechanical properties. The size and shape of the crystals, as well as the size and shape of the magnesium hydroxide agglomerates can be changed by changing the crystallization conditions. The dispersivity and specific surface area of magnesium hydroxide may be significantly improved by recrystallization with the use of hydrothermal modification [Jianmin Chen, Li Lin, Yunhua Song, Lei Shao. Influence of KOH on the hydrothermal modification of Mg(OH)$_2$//Journal of Crystal Growth, 2009, 311, 2405-2408].

The inventors [Patent EP 0365347, published on 25 Apr. 1990] describe a process for the preparation of magnesium hydroxide, comprising heating a basic magnesium chloride or nitrate of the formula Mg(OH)$_{2-x}$A$_x$mH$_2$O, wherein A is Cl or NO$_3$, x has a value from 0 to 0.2 and m is a number from 0 to 6, and showing peaks at 8.2 Å, 4.1 Å, 2.7 Å, 2.0 Å, 1.56 Å and 1.54 Å, as measured using the X-ray diffraction method, in a reaction stock solution of said basic magnesium chloride or nitrate under atmospheric or lower pressure at a temperature from 50 to 120° C. Said method provides for high-purity and finely-dispersed magnesium hydroxide having an average diameter of secondary particles of up to 1.5 μm and the diameter of 90% of the secondary particles is up to 4.0 μm. It is noted that the reduction in the diameter of the secondary particles has been achieved due to the reduction in the size of the particles of magnesium hydroxide and the decrease of the amount of primary particles that form a secondary particle (primary particles agglomerate). However, magnesium hydroxide as described has a specific surface area of 20 to 50 m$^2$/g, which eliminates the possibility of its use as a flame retardant filler in polymeric matrices.

The U.S. Pat. No. 4,246,254 (published on 20 Jan. 1981) describes a process for the preparation of magnesium hydroxide having a hexagonal, needle-like crystalline structure, wherein a magnesium compound having a hexagonal needle-like crystalline structure expressed by the formula Mg(OH)$_{2-nx}$A$_x{}^{n-}$mH$_2$O, wherein A is a monovalent or bivalent anion selected from the group consisting of Cl$^-$, Br$^-$, NO$_3{}^-$ and SO$_4{}^-$, x has a value of from 0.2 to 0.5, and m is a number from 0 to 2, is dried under conditions that do not destroy its hexagonal needle-like crystalline structure in such a manner as to remove a portion of crystallized water from said magnesium compound; and further, the dried magnesium compound is interacted with an alkali selected from the group consisting of alkali metal hydroxides, ammonia, calcium hydroxide and ammonium hydroxide in an inert liquid medium selected from the group consisting of water, acetone and lower alcohols. The thereby obtained magnesium hydroxide with fibrillary structure has a crystal length to diameter ratio of at least 10, as determined by an electron microscope with a 1000-fold magnification. Magnesium hydroxide having a fibrillary structure may be used both in the already known fields of its use and in new, hitherto not utilized fields. However, the inventors indicate neither the average size of the secondary particles of magnesium hydroxide nor the specific surface area, which in fact excludes the possibility to evaluate its utility as a flame retardant filler in polymeric matrices.

The U.S. Pat. No. 5,872,169 (published on 16 Feb. 1999) describes a process for the preparation of magnesium hydroxide having a flame retardant property, said method comprises the interaction of magnesium chloride solution with ammonia added in excess of the stoichiometric amount, resulting in the formation of magnesium hydroxide precipitate and hydrothermal recrystallization of magnesium hydroxide. The obtained hydroxide with a flame retardant property has a specific surface area, as determined by the BET method, of less than 10 $m^2/g$, the average particle diameter of 0.5-10.0 μm or less, as determined by the laser diffraction method, and a large amount of crystals having an ovoid cross-sectional shape. Unfortunately, the inventors do not indicate such important characteristics of the secondary particles as the diameter of 10% of its particles and the diameter of 90% of its particles, as well as the size of the primary particles.

Several inventions (Patent EP 0780425, published on 25 Jun. 1997, Application WO2007117841, published on 18 Oct. 2007, Patent CZ 9300994, published on 15 Dec. 1999] disclose magnesium hydroxide particles having an average diameter of the secondary particles and a specific surface area according to BET which allow using said particles as a flame retardant filler in polymeric materials. Nevertheless, the above mentioned disclosures indicate neither the characteristics of the secondary particles such as the diameter of 10% of the secondary particles and the diameter of 90% of the secondary particles nor the characteristics of the primary particles (hexagonal plates) of magnesium hydroxide, in particular their size (length and thickness), which is directly dependent on the conditions of synthesis and hydrothermal processing and, subsequently, when the particles of magnesium hydroxide are used as a flame retardant filler, they have an effect on the properties of the polymer and on the technological effectiveness of the production thereof; the adjustability of primary particle growth is not indicated either.

The closest prior art is the method for the preparation of micro- and/or nanometric magnesium hydroxide [patent RU2422364, published on 27 Jun. 2011], wherein in an aqueous medium magnesium chloride is interacting with sodium hydroxide and chloride, or potassium hydroxide and chloride, or calcium hydroxide and chloride, or ammonium hydroxide and chloride in one step at a temperature of 10-200° C. and atmospheric or autogenic pressure, or in two steps: in the first step at a temperature of 10-100° C. and atmospheric pressure, and in the second step at a temperature of 101-200° C. and autogenic pressure with possible modification and subsequent separation of magnesium hydroxide. Said method provides for obtaining magnesium hydroxide consisting of micro- and/or nanometric particles having a specific surface area, as determined by the BET method, of from 3 to 100 $m^2/g$, an average diameter of the secondary particles, as determined by laser diffraction method, of from 0.1 to 50 μm, and primary particles of a plate-like shape with a longitudinal size of 50-600 nm and a thickness of 5-60 nm, as determined by scanning electron microscope image (SEM). However, the inventors do not indicate the characteristics of the secondary particles such as the diameter of 10% of the secondary particles and the diameter of 90% of the secondary particles. Furthermore, the addition of an additional excessive amount of chlorides into the reaction mass complicates washing of the magnesium hydroxide particles free from chlorides, the content of which in the end product is subject to rather strict requirements, requires an additional amount of demineralized water during washing off and, possibly, additional repulping and filtering, resulting in the complication of the process instrumentation and in the increase of manufacturing costs of the end product.

The objective of the present invention is to provide nanoparticles of flame retardant magnesium hydroxide, possibly surface-processed, having a hexagonal plate-like structure with a specific surface area, as determined by the BET method, of up to 20 $m^2/g$, preferably from 2 to 15 $m^2/g$, with an average diameter of the secondary particles, as determined by the laser diffraction method, of up to 2 μm, preferably from 0.7 to 1.7 μm, with particle characteristics providing for the most efficient use thereof as a flame retardant filler, namely with a diameter of 10% of the secondary particles of up to 0.8 μm, a diameter of 90% of the secondary particles of up to 5 μm, a longitudinal size of the primary particles of from 150 to 900 nm, preferably from 200 to 600, and a thickness of from 15 to 150 nm, preferably from 40 to 100 nm.

The objective is achieved in that nanoparticles of flame retardant magnesium hydroxide are prepared in two steps, the first step consisting of the interaction of an aqueous solution of magnesium chloride with an alkali component at a temperature of up to 100° C. and atmospheric pressure, with molar ion ratio $OH^-:Mg^{++}$ in the range of 1.9÷2.1:1; the second step consisting in hydrothermal recrystallization of the magnesium hydroxide particles at a temperature of 120-220° C., a pressure of from 0.18 to 2.3 MPa and a duration of from 2 to 24 h, wherein, during hydrothermal recrystallization, in order to prevent the further growth of the primary particles and the coarsening of the secondary particles by aggregation, the reaction mass is subjected to periodic hydraulic impacts with superheated vapour with a temperature of 160-240° C. and pressure of from 0.6 to 3.3 MPa.

Preparing the nanoparticles of flame retardant magnesium hydroxide with the desired characteristics is achieved by a specific hydrothermal processing, wherein, in order to prevent the growth of the primary particles which takes place during hydrothermal recrystallization, metered hydraulic impacts are performed using superheated vapour at a pressure of from 0.6 to 3.3 MPa and a temperature of from 160 to 240° C. with continuous stirring. Hydraulic impacts isolate a crystallizing particle from the stock solution thereby stopping the particle growth process, i.e. its coarsening. At the moment of supplying superheated vapour, impact waves are generated in a liquid medium within an on-port zone, the impact of said waves resulting in destruction of the formed agglomerates of primary particles. Furthermore, when superheated vapour contacts with the liquid medium, a jet of supplied vapour is broken down into a plurality of vapour bubbles which at collapse generate cavitation impact microwaves preventing the agglomeration of the primary particles.

Changing the frequency of hydraulic impacts and their distribution in the volume of the reaction mass and stirring rate allows regulating the ratio between primary particles of various sizes. Thus, as a result of an intensive stirring, frequent hydraulic impacts and uniform distribution thereof in the volume of the reaction mass, smaller, homogenous in size, hexagonal plates and secondary particles of magnesium hydroxide are formed. In contrast, as a result of the localized periodical hydraulic impacts and mild stirring, coarser hexagonal plates and secondary particles of magnesium hydroxide are formed.

Hydrothermal recrystallization results in the formation of particles of magnesium hydroxide with a well-definable hexagonal morphology.

The process of hydrothermal recrystallization is carried out at a temperature of 120-220° C., preferably at a temperature of 140-200° C., in a periodic or continuous mode in a reactive stock solution medium or in a deionized water medium.

As initial stock solution, a stock solution obtained by the interaction of a magnesium chloride solution and an alkali component is used.

The duration of hydrothermal recrystallization makes up from 2 to 24 h, most preferably from 4 to 16 h.

As magnesium chloride, a naturally occurring (sea water or ocean water, lake brine, underground brine, etc.) or synthetic (obtained by dissolution of magnesite, dolomite or brucite in a hydrochloric acid) magnesium chloride is used.

It is preferable to use a magnesium chloride solution prepurified from undesirable admixtures such as iron and/or bromine, and/or boron, and/or sulphates, and/or manganese, etc.

As an alkali component, an aqueous solution of sodium hydroxide or potassium hydroxide, or ammonium hydroxide, or a calcium hydroxide suspension is used.

Hydrothermal recrystallization may be carried out within a wide range of concentrations of the reagents in the stock solution, the content of magnesium hydroxide of 2-10% being preferable. In such a case, the molar ratio of ions $OH^-:Mg^{++}$ should be within the range of 1.9÷2.1:1.

Hydraulic impacts are carried out at a reaction mass temperature of 120-220° C. during hydrothermal recrystallization and are effected by the supply of superheated vapour (direct steam) through the holes of any, for example round, section. The use of direct steam with a temperature of 160-240° C. and pressure of 0.6-3.3 MPa is preferable.

The obtained nanoparticles of magnesium hydroxide flame retardant have a hexagonal plate-like structure with a specific surface, as determined by the BET method, of up to 20 $m^2/g$, an average diameter of secondary particles, as determined by laser diffraction method, of up to 2 μm, a diameter of 10% of the secondary particles of up to 0.8 μm, a diameter of 90% of the secondary particles of up to 5 μm, a longitudinal size of the primary particles of from 150 to 900 nm and a thickness of from 15 nm to 150 nm. Said particles have an oil carrying capacity of up to 50 g of linseed oil per 100 g of magnesium hydroxide, a pore volume of up to $10.5\times10^{-3}$ $cm^3/g$ and a weight fraction of iron with respect to iron trioxide of up to 0.01%.

The nanoparticles of magnesium hydroxide obtained by using the above mentioned process may be modified by one or more binding agents and/or surface processing agents.

As silane binding agents, compounds selected from the group of organofunctional trialkoxysilanes comprising alkyltriethoxysilanes, alkyltrimethoxysilanes, alkenyltriethoxysilanes, alkenyltrimethoxysilanes, aminosilanes, etc., and/or mixtures thereof are used. Examples of such compounds include methyltriethoxysilane, octyltriethoxysilane, vinyltrimethoxysilane, vinyltriethoxysilane, vinyl-tris-(2-methoxyethoxy)silane, 3-methacryloxypropyltrimethoxysilane, epoxycyclohexy)-ethyltrimethoxysilane, glycidoxypropyltrimethoxysilane, 3 mercaptopropyltrimethoxysilane, 3-aminopropyltriethoxysilane, etc.

As surface processing agents, compounds selected from the group of saturated and unsaturated fatty acids containing from 8 to 20 carbon atoms, or alkali salts thereof and/or mixtures thereof are used. Examples of such compounds include stearic acid, oleic acid, lauryl acid, palmitic acid, behenic acid, myristic acid, tall oil fatty acids, etc.

Surface processing is carried out by means of using known methods, for example suspension method or dry method, or during the drying process, for example, in a rotary jet mill.

It is preferable to use agents for surface processing in an amount of 0.1-5.0% with respect to magnesium hydroxide.

Nanoparticles of flame retardant magnesium hydroxide, obtained according to the present process have controllable sizes of the primary and secondary particles and a specific surface area, which allows using them in organic polymeric matrices as smoke-suppressing, non-toxic flame retardants without a reduction in mechanical properties and technological effectiveness.

Nanoparticles of flame retardant magnesium hydroxide, obtained according to the present process, due to their unique properties can be used in polymeric matrices comprising polyethylene, polypropylene, ethylene propylene copolymer, ethylene acrylate copolymer, polystyrene, ethylene-co-vinylacetate based polymer, polyamide, polyimide, polycarbonate, polyethyleneterephthalate, polybutyleneterephthalate, ABS plastic, etc.

The present process for the preparation of nanoparticles of flame retardant magnesium hydroxide retardant is illustrated by the following examples which demonstrate the essence of the present invention.

The following analytic methods were used in the analysis of magnesium hydroxide particles:
  The particle-size distribution was determined by laser diffraction method using Malvern MasterSizer—2000 E device with Scirocco 2000 module from Malvern Instruments Limited (UK);
  The specific surface area according to the BET method and pore volume were determined by using a Nova 2200 e high-speed surface area and pore-size analyzer from Quantachrome Instruments (USA);
  The particle shape and the size of particles were determined by using a scanning electron microscope;
  The oil carrying capacity was determined according to GOST 21119.8-75, item 3;
  The weight fraction of iron was determined by the sulphosalicylic method.

COMPARATIVE EXAMPLE

Figure 1:
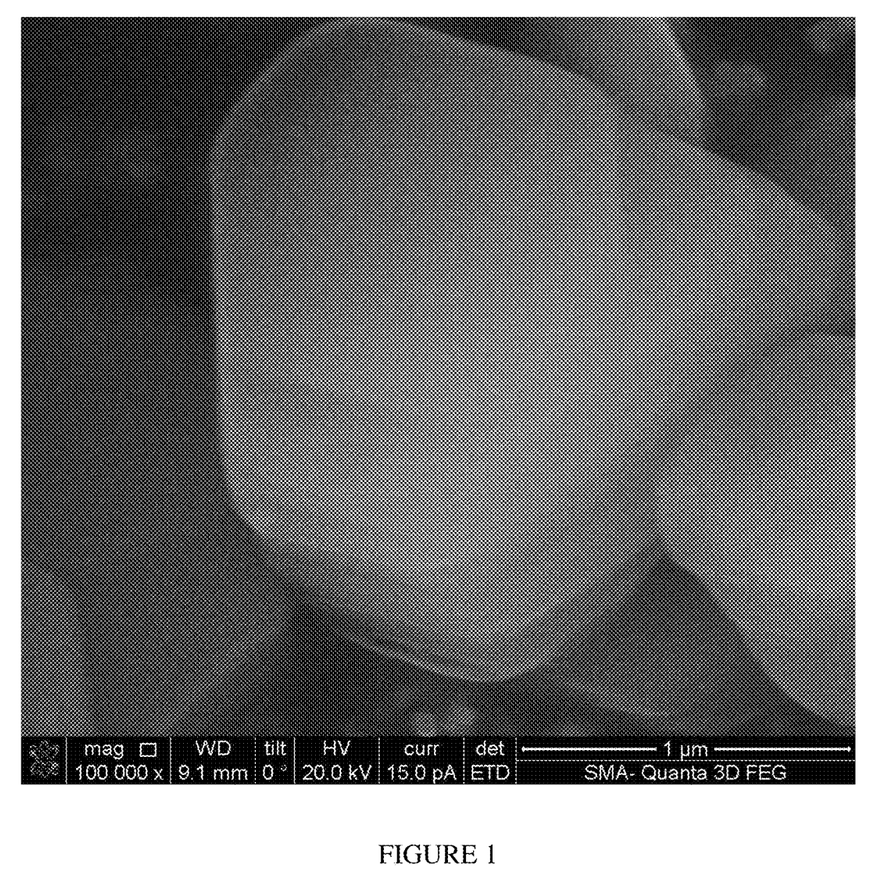
Figure 2:
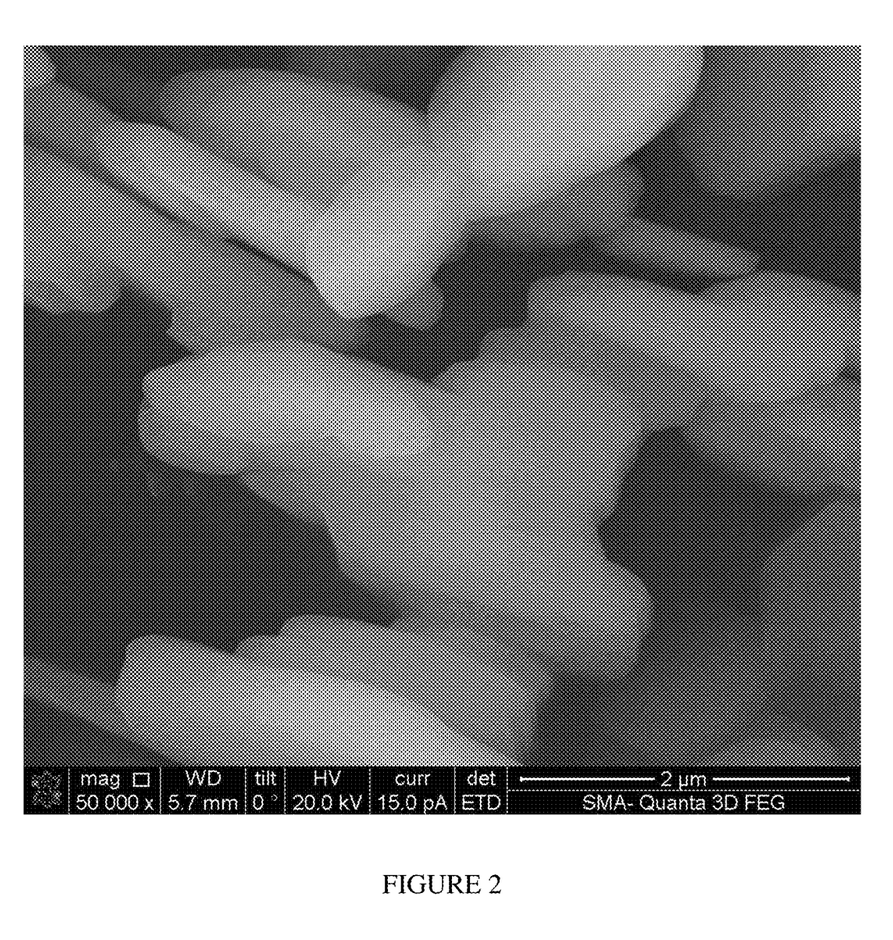

An autoclave reactor equipped with a jacket and a turbine mixer while stirring is charged with 760.40 kg of sodium hydroxide solution with a 10% weight fraction and 282.09 kg of bischofite solution with a 32% weight fraction of magnesium chloride and a 0.0008% weight fraction of iron. The molar ratio of ions $OH^-:Mg^{++}$ constitutes 2.006:1. The reactor content is heated to a temperature of 180-190° C. and kept stirred for 12 h. After cooling, the suspension with a 5.3% weight fraction of magnesium hydroxide is cooled, filtered and washed from chlorides on a press filter. The squeezed precipitate of magnesium hydroxide is dried in a vacuum oven at a temperature of 60-65° C. and a pressure of 100-650 mm Hg, then ground in a hammer type mill. The characteristics of the obtained magnesium hydroxide are given in the table, the shape and the size of the primary particles are shown in FIGS. 1 and 2.

EXAMPLE 1

Figure 3:
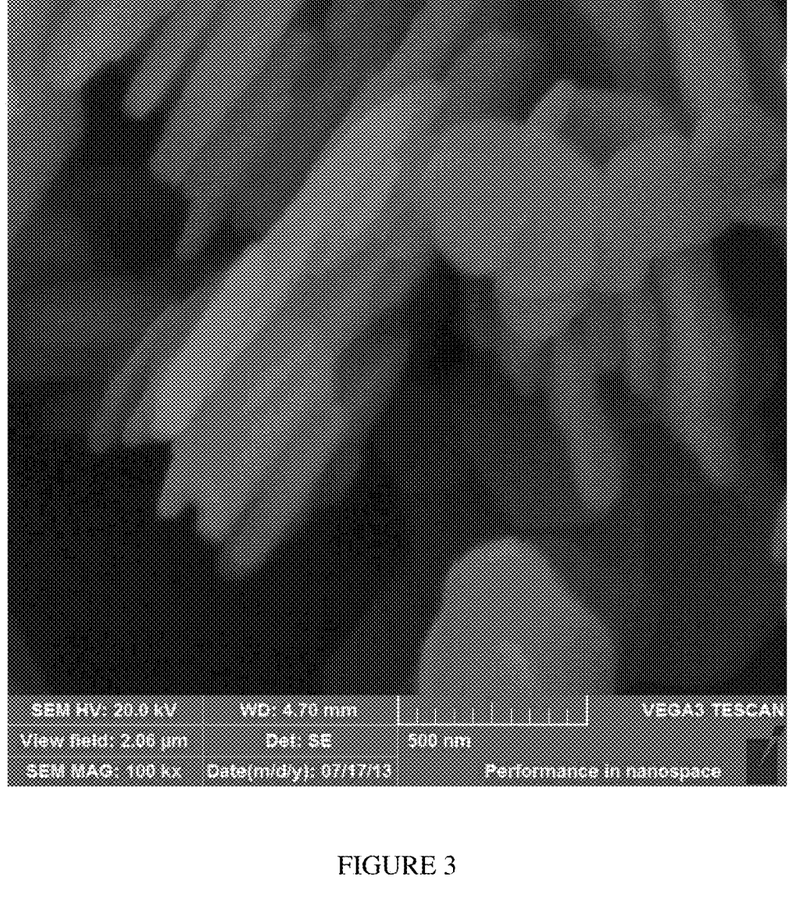
Figure 4:
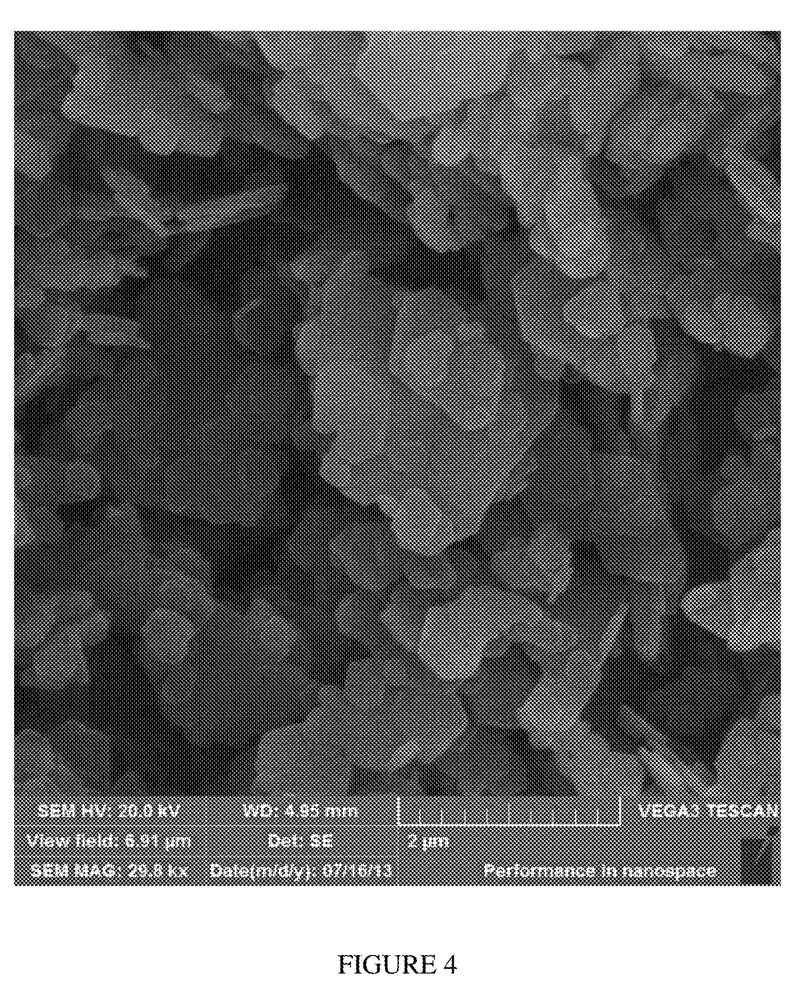

A reactor equipped with a jacket, a blade-paddle stirrer and a thermocouple element while stirring for 30 minutes, is simultaneously charged with 1.036 m³ of potassium hydroxide solution with a 18.3% weight fraction and 0.421 m³ of bischofite solution with a 33.5% weight fraction of magnesium chloride and a 0.0006% weight fraction of iron. The molar ratio of ions $OH^-:Mg^{++}$ constitutes 2.006:1. The reaction mass is heated to 45-55° C. and kept stirred for 1 h. Then the reaction mass is transferred to an autoclave equipped with a double-level blade-paddle stirrer, a jacket and two bubblers having round section holes for the supply of superheated vapour, wherein the holes are lowered by ⅔ of their height below the reaction mass level and located oppositely. The reaction mass is heated while stirring and held at a temperature of 180-185° C. with an intermittent pulse supply of direct steam at a flow rate of 1.5-2.5 m³/h, at a temperature of 190° C. and pressure of 1.3 MPa for 2 h. The obtained suspension is filtered and washed on a press filter with demineralized water and dried in a rotary jet mill. The characteristics of the obtained magnesium hydroxide are given in the table, the shape and the size of the primary particles are shown in FIGS. 3 and 4.

EXAMPLE 2

Figure 5:
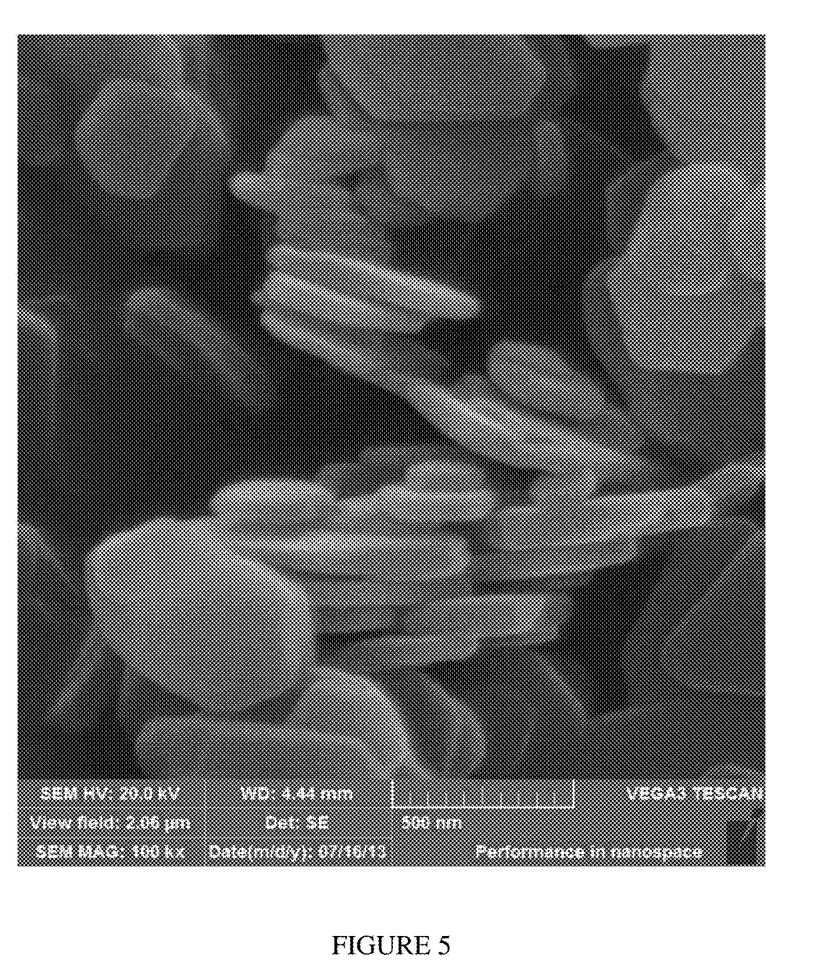
Figure 6:
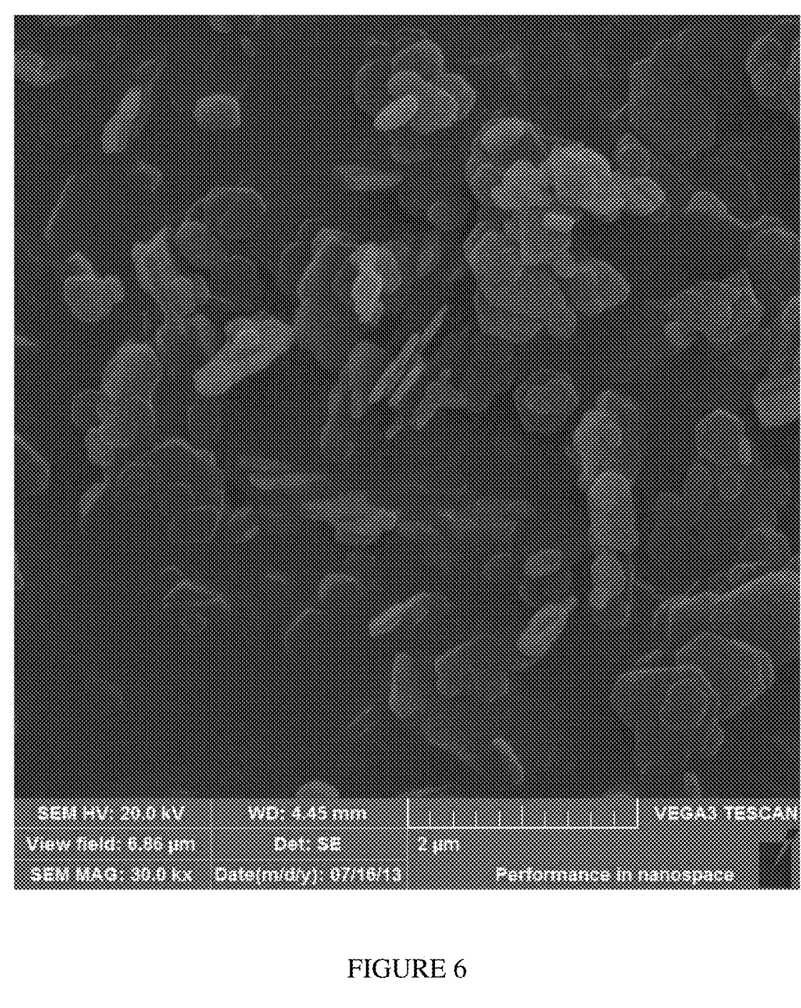

A reactor equipped with a jacket, a blade-paddle stirrer and a thermocouple element while stirring for 30 min is simultaneously charged with 0.881 m³ of sodium hydroxide solution with a 15.4% weight fraction and 0.421 m³ of purified bischofite solution with a 33.5% weight fraction of magnesium chloride and a 0.00035% weight fraction of iron. The molar ratio of ions $OH^-:Mg^{++}$ constitutes 2.014:1. The reaction mass is heated to 45-55° C. and kept stirred for 1 h. Then the reaction mass is transferred to an autoclave equipped with a double-level blade-paddle stirrer, a jacket and two bubblers having round section holes for the supply of superheated vapour, lowered by ⅔ of the height below the reaction mass level and located oppositely. The reaction mass is heated while stirring and held at a temperature of 180-185° C. with an intermittent pulse supply of direct steam at a flow rate of 1.5-2.5 m³/h, at a temperature of 220° C. and pressure of 2.3 MPa for 6 h.

The separation of magnesium hydroxide is carried out in the manner described in Example 1. The characteristics of the obtained magnesium hydroxide are given in the table, the shape and the size of the primary particles are shown in FIGS. 5 and 6.

EXAMPLE 3

Figure 7:
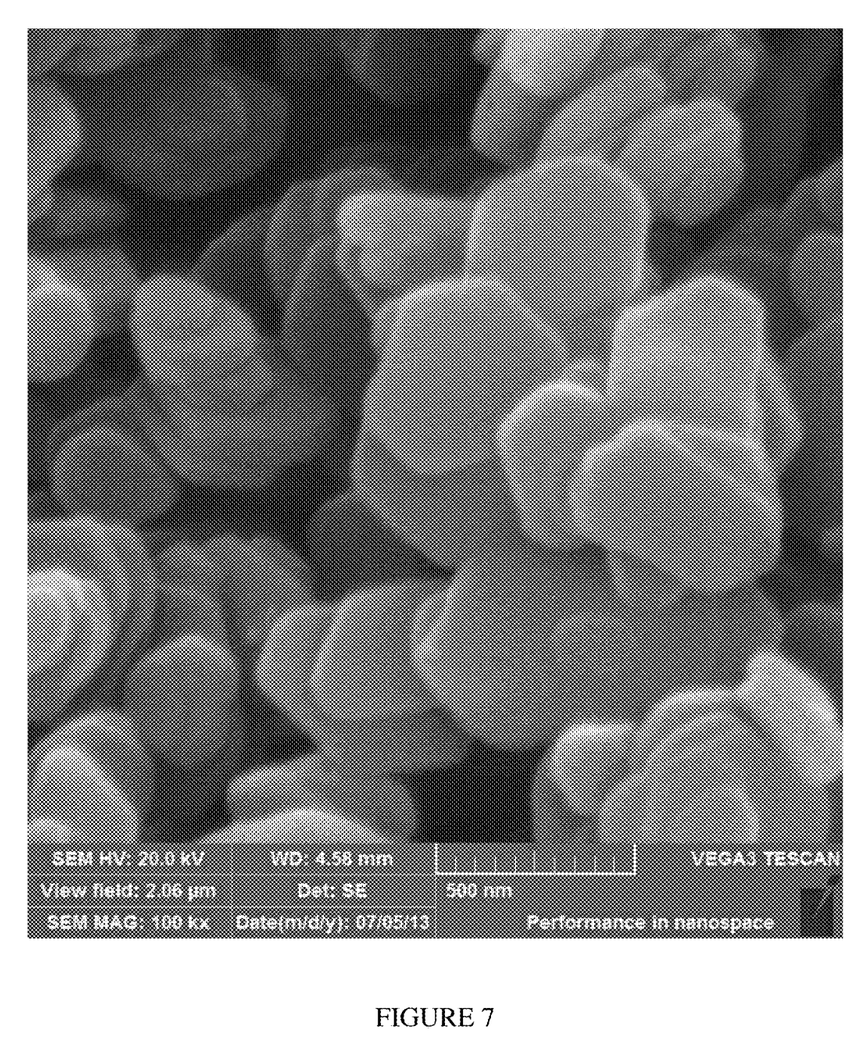
Figure 8:
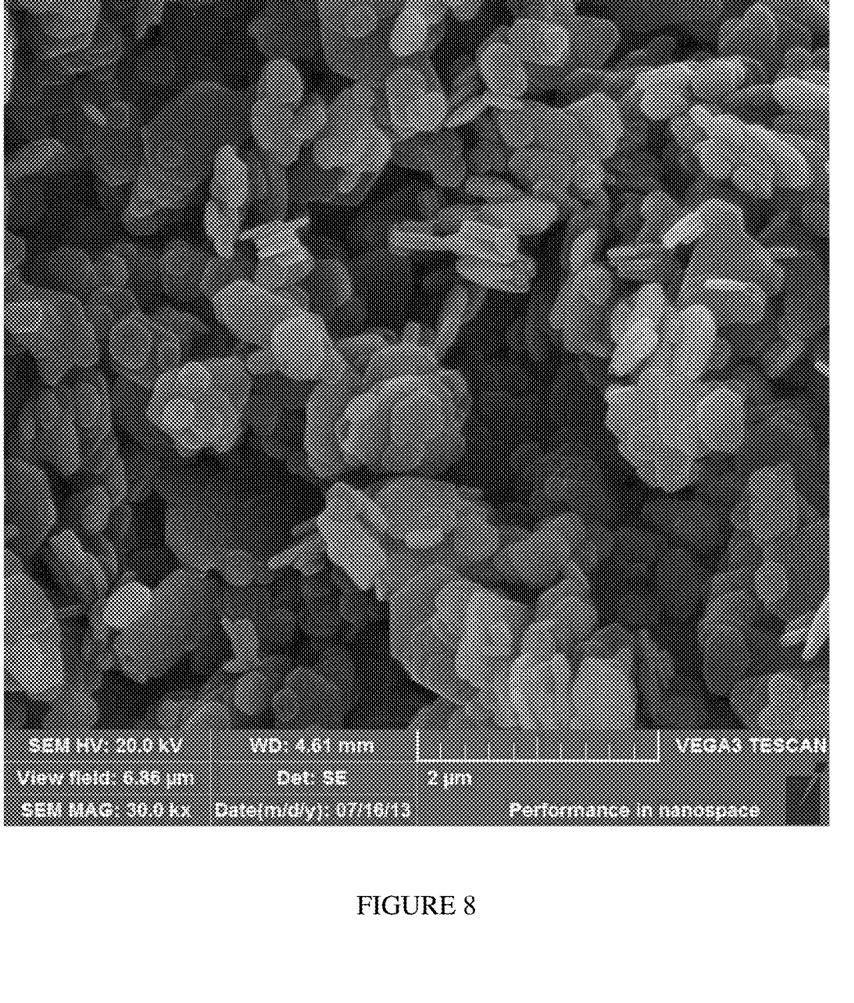

A reactor equipped with a jacket, a blade-paddle stirrer and a thermocouple element while stirring is simultaneously charged with 103.5 kg/h of sodium hydroxide solution with a 17% weight fraction and 64.97 kg/h of purified bischofite solution with a 32% weight fraction of magnesium chloride and a 0.0003% weight fraction of iron. The molar ratio of ions $OH^-:Mg^{++}$ constitutes 2,014:1. The temperature of the reaction mass in the reactor is maintained at 40-50° C., residence time is 1 h. From the synthesis reactor the reaction mass is transferred to an autoclave equipped with a double level blade-paddle stirrer, a jacket and a bubbler having round section holes for the supply of superheated vapour, lowered by ⅔ of the height below the reaction mass level. The temperature of the reaction mass in the autoclave is maintained at 175-185° C., residence time is 12 h. The supply of direct steam with a flow rate of 25-40 kg/h, temperature of 190° C. and a pressure of 1.3 MPa is carried out intermittently. From the autoclave the suspension of magnesium hydroxide particles is discharged under pressure into a collector below the suspension layer. The obtained suspension is filtered and washed on a press filter with demineralized water and dried in a rotary jet mill. The characteristics of the obtained magnesium hydroxide are given in the table, the shape and the size of the primary particles are shown in FIGS. 7 and 8.

TABLE

Characteristics of magnesium hydroxide

| Parameter | Comparative Example | Example 1 | Example 2 | Example 3 |
|---|---|---|---|---|
| Specific surface, m²/g | 14.9 | 11.3 | 5.2 | 7.1 |
| Particle-size distribution: | | | | |
| diameter of 10% particles | 0.545 | 0.187 | 0.236 | 0.201 |
| diameter of 50% particles | 1.523 | 0.715 | 1.024 | 0.895 |
| diameter of 90% particles | 4.105 | 2.472 | 3.381 | 2.696 |
| Weight content of iron with respect to iron trioxide ($Fe_2O_3$), % | 0.04 | 0.02 | 0.01 | 0.01 |
| Weight of oil adsorbed on 100 g of magnesium hydroxide, g | 50 | 48 | 32 | 39 |
| Pore volume, cm³/g | 7.566 $10^{-3}$ | 6.024 · $10^{-3}$ | 2.522 · $10^{-3}$ | 3.762 · $10^{-3}$ |
| Whiteness, % | 98 | 99 | 100 | 100 |

EXAMPLE 1 OF SURFACE PROCESSING

A reactor with a stirrer and a jacket is charged while stirring with 423.92 kg of demineralized water, 125.15 kg of magnesium hydroxide precipitate from a filter obtained according to Example 2, with a 43.97% weight fraction of magnesium hydroxide and a 0.10% weight fraction of sodium chloride, and 1.10 kg of stearic acid with a 99.5% weight fraction. The suspension is heated to a temperature of 80-90° C., held for 1-2 h, then filtered on a press filter and dried in a rotary jet mill. Surface processed particles of magnesium hydroxide are obtained, wherein the weight content of stearic acid constitutes 2%.

EXAMPLE 2 OF SURFACE PROCESSING

A Henschel-type mixer is charged with 200 g of magnesium hydroxide with a 1.5% weight fraction of water obtained according to Example 2, 2 g of vinyltrimethoxysilane Silquest A-171 is supplied and stirred for 40-60 minutes. Surface processed particles of magnesium hydroxide are obtained, wherein the weight content of vinyltrimethoxysilane constitutes 1%.

The given examples show that the proposed method provides for the preparation of nanoparticles of magnesium hydroxide flame retardant with controllable sizes of the primary and secondary particles and specific surface area. Example of the use of nanoparticles of magnesium hydroxide flame retardant 100 weight parts of impact-proof polypropylene, 0.2 weight parts of Irganox 1010 antioxidant and 185 weight pails of nanoparticles of magnesium hydroxide flame retardant obtained according to Example 3 are stirred to a homogenous state and extruded in a double-screw extruder at a temperature of 230° C. to obtain granules.

The invention claimed is:

1. Nanoparticles of flame retardant magnesium hydroxide having primary particles of an irregular hexagonal plate-like structure, the nanoparticles comprising:
   a surface area determined by the BET method of up to 20 $m^2/g$;
   an average diameter of secondary particles of magnesium hydroxide determined by a laser diffraction method of up to 2 μm; and
   wherein diameters of 10% of the secondary particles of the magnesium hydroxide do not exceed 0.8 μm, diameters of 90% of the secondary particles do not exceed 5 μm; an oil carrying capacity for the nanoparticles of up to 50 g of linseed oil per 100 g of magnesium hydroxide and a total pore volume for the nanoparticles of up to $10.5 \times 10^{-3}$ $cm^3/g$, wherein primary particles of the magnesium hydroxide have a shape of irregular hexagonal plates with a longitudinal size of from 150 to 900 nm, and a thickness of from 15 to 150 nm as determined by scanning electron microscopy, wherein the secondary particles of the magnesium hydroxide being agglomerates of the primary particles, wherein an iron content with respect to iron trioxide ranging from greater than 0.0% to 0.01% is present.

2. The nanoparticles of flame retardant magnesium hydroxide according to claim 1, wherein an average size of the secondary particles determined by the laser diffraction method ranges from 0.7 to 1.7 μm.

3. The nanoparticles of flame retardant magnesium hydroxide according to claim 1, wherein the surface area determined by the BET method ranges from 2 to 15 $m^2/g$.

4. The nanoparticles of flame retardant magnesium hydroxide according to claim 1, wherein the longitudinal size of the primary particles ranges from 200 to 600 nm and the thickness of the primary particles ranges from 40 to 100 nm.

5. The nanoparticles of flame retardant magnesium hydroxide according to claim 1, wherein the primary particles and the secondary particles are surface-processed with one or more silane binding agents, selected from the group of organofunctional trialkoxysilanes consisting of alkyltriethoxysilanes, alkyltrimethoxysilanes, alkenyltriethoxysilanes, and alkenyltrimethoxysilanes, and/or with one or more surface processing agents selected from the group of saturated and unsaturated fatty acids comprising from 8 to 20 carbon atoms consisting of stearic acid, oleic acid, lauryl acid, palmitic acid, behenic acid, myristic acid, tall oil fatty acids, alkali salts thereof and mixtures thereof, in an amount of 0.1-5.0% with respect to magnesium hydroxide.

6. The nanoparticles of flame retardant magnesium hydroxide according to claim 1, wherein each of the primary particles have an aspect ratio as defined as the longitudinal size/thickness that has a value that is at least 6.

7. A process for the preparation of nanoparticles of flame retardant magnesium hydroxide, having hexagonal plate-like structure, said nanoparticles comprising:
   a surface area determined by the BET method of up to 20 $m^2/g$,
   an average diameter of secondary particles of the magnesium hydroxide determined by the laser diffraction method of up to 2 μm, and
   wherein diameters of 10% of the secondary particles of the magnesium hydroxide do not exceed 0.8 μm, diameters of 90% of the secondary particles do does not exceed 5μm, an oil carrying capacity for the nanoparticles of up to 50 g of linseed oil per 100 g of magnesium hydroxide and a total pore volume of the nanoparticles of up to $10.5 \times 10^{-3}$ $cm^3/g$, wherein primary particles of the magnesium hydroxide have a shape of irregular hexagonal plates with a longitudinal size of from 150 to 900 nm, and a thickness of from 15 to 150 nm as determined by scanning electron microscopy, wherein the secondary particles of the magnesium hydroxide being agglomerates of the primary particles, wherein an iron content with respect to iron trioxide ranging from greater than 0.0% to 0.01% is present, the method comprising:
   interacting an aqueous solution of magnesium chloride with an alkali component and comprising a first process and a second process, wherein the first process comprises interacting an aqueous solution of magnesium chloride with an alkali component at a temperature of up to 100 C and atmospheric pressure, with a molar ion ratio OW: $Mg^{=}$ in the range of 1.9-2.1 : 1, and the second process comprises hydrothermal recrystallization of the magnesium hydroxide particles at a temperature of 120-220 ° C., a pressure of from 0.18 to 2.3 MPa and a duration of from 2 to 24 h, wherein, during hydrothermal recrystallization, in order to prevent the further growth of the primary particles and the coarsening of the secondary particles by aggregation, the reaction mass is subjected to periodic hydraulic impacts with superheated vapor at a temperature of 160-240 ° C. and a pressure of from 0.6 to 3.3 MPa.

8. The process according to claim 7, wherein a naturally occurring or synthetic magnesium chloride is used as magnesium chloride.

9. The process according to claim 7, wherein the aqueous solution of magnesium chloride is prepurified from undesirable admixtures of iron and/or bromine, and/or boron, and/or sulphates, and/or manganese.

10. The process according to claim 7, wherein an aqueous solution of sodium hydroxide or potassium hydroxide, or ammonium hydroxide, or a calcium hydroxide suspension is used as an alkali component.

11. The process according to claim 7, wherein the preparation of nanoparticles of magnesium hydroxide is carried out in a periodic or continuous mode.

12. The process according to claim 7, wherein the hydrothermal recrystallization is carried out in the initial stock solution medium or in a deionized water medium.

13. The process according to claim 7, wherein the hydraulic impacts with superheated vapor are effected through holes of any size.

14. The process according to claim 7, wherein the obtained primary and secondary particles of magnesium hydroxide are subjected to surface processing with one or more silane binding agents, selected from the group of organofunctional trialkoxysilanes consisting of alkyltriethoxysilanes, alkyltrimethoxysilanes, alkenyltriethoxysilanes, and alkenyltrimethoxysilanes, and/or with one or more surface processing agents selected from the group of saturated and unsaturated fatty acids comprising from 8 to 20 carbon atoms, consisting of stearic acid, oleic acid, lauryl acid, palmitic acid, behenic acid, myristic acid, tall oil fatty acids, alkali salts thereof and mixtures thereof, in an amount of 0.1-5.0% with respect to magnesium hydroxide.

* * * * *

UNITED STATES PATENT AND TRADEMARK OFFICE
CERTIFICATE OF CORRECTION

PATENT NO. : 10,822,544 B2  
APPLICATION NO. : 14/762999  
DATED : November 3, 2020  
INVENTOR(S) : Elena Petrovna Gordon et al.

Page 1 of 1

It is certified that error appears in the above-identified patent and that said Letters Patent is hereby corrected as shown below:

On the Title Page

In (71) Applicant, delete "JOINT STOCK COMPANY KAUISTIK" and insert in its place --JOINT STOCK COMPANY KAUSTIK--.

In the Claims

In Column 9, Claim 7, Line 67, delete "does".

In Column 10, Claim 7, Line 21, delete "OW: Mg$^=$" and insert in its place --OH$^-$: Mg$^{++}$--.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*